No. 764,646. PATENTED JULY 12, 1904.
C. W. VAN WINKLE.
AUTOMOBILE.
APPLICATION FILED FEB. 26, 1904.
NO MODEL.
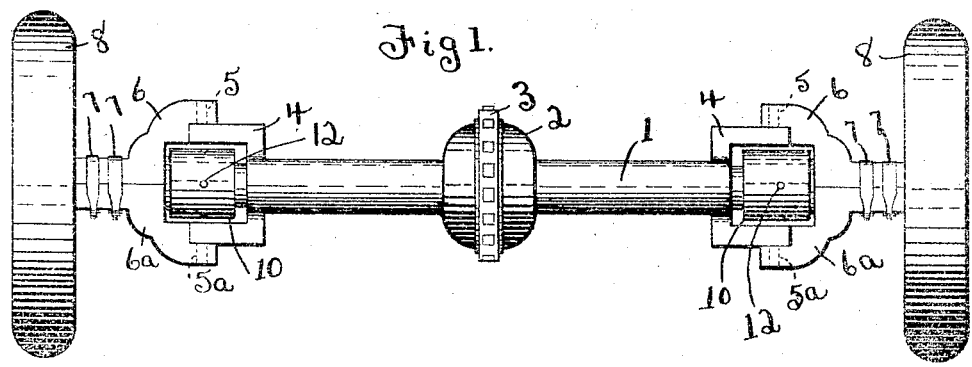
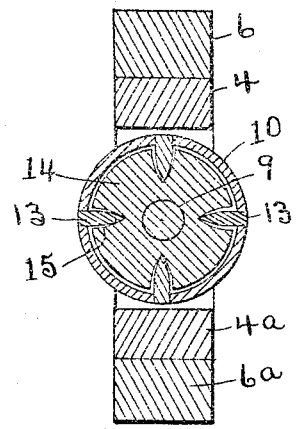
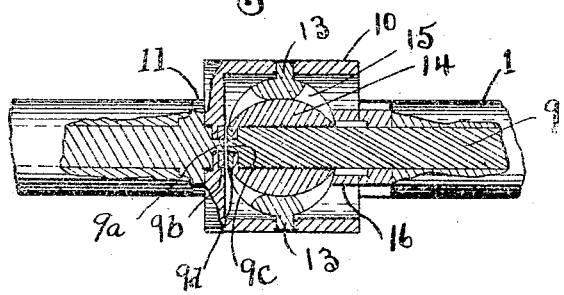
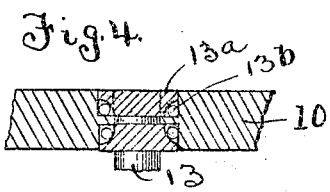
Witnesses
Percy S. Webster
Lena Williams
Inventor
Charles W. Van Winkle
By Joshua B. Webster,
Attorney No. 764,646. Patented July 12, 1904.

UNITED STATES PATENT OFFICE.

CHARLES W. VAN WINKLE, OF FARMINGTON, CALIFORNIA.

AUTOMOBILE.

SPECIFICATION forming part of Letters Patent No. 764,646, dated July 12, 1904.

Application filed February 26, 1904. Serial No. 195,340. (No model.)

*To all whom it may concern:*

Be it known that I, CHARLES W. VAN WINKLE, a citizen of the United States, residing at Farmington, in the county of San Joaquin and State of California, have invented certain new and useful Improvements in Automobiles; and I do declare the following to be a full, clear, and exact description of the invention, such as will enable others skilled in the art to which it appertains to make and use the same, reference being had to the accompanying drawings, and the figures of reference marked thereon, which form a part of this specification.

My invention relates to improvements in motor-vehicles; and it consists in the effective and simple construction and combination of parts which I will hereinafter describe and claim.

My object is to produce a machine which will readily climb hills, and I accomplish this by connecting the front axle with the motor-power by means of a sprocket wheel and chain and arranging on said axle a cup-and-ball knuckle near each wheel which will permit the wheels to be steered and still be revolved by means of the motor-power.

In order that my invention may be clearly understood and readily carried into effect, I will now proceed, aided by the accompanying drawings, fully to describe the same.

Referring to the drawings, Figure 1 is a view of the front running-gear of an automobile, showing my improvements thereon. Fig. 2 is a sectional view of an end elevation of a cup-and-ball knuckle. Fig. 3 is a side elevation of a cup-and-ball knuckle, partly broken out. Fig. 4 is a sectional view of a ball-bearing.

Similar numerals of reference indicate corresponding parts in the several views.

1 designates the axle-casing of the machine. 2 is the casing covering the sprocket-gearing connected to the axle; 3, a sprocket-wheel attached to an axle 9, hereinafter described. 4 designates male yokes at each end of the casing 1. 5 designates pins on the upper and lower sides of same.

6 $6^a$ are female yokes pivoted to the male yokes 4 on the pins 5. Said yokes 6 $6^a$ are divided into the portions 6 and $6^a$, so that they may be pivoted on the said pins. Said parts 6 and $6^a$ are suitably grooved, so as to be clamped over the axle 9 by means of the clamps 7.

8 designates any suitable wheels attached rigidly to the axle 9.

9 is a suitable axle seated in the casing 1 and on which are clamped the yokes 6 $6^a$. To the center of said axle is attached the sprocket-wheel 3 and at each end the wheels 8. In said axle 9, at the points within the yokes 4 and 6 $6^a$, are flexible knuckles constructed, preferably, as follows: On the part of the axle protruding through the yokes 6 $6^a$ are screwed cups 10. On reduced portions $9^a$ are screwed nuts $9^b$, said nuts being countersunk in the bottoms of the cups 10. On the ends of the axle 9, projecting through the casing 1, are screwed cog-balls 14. On reduced portions $9^c$ nuts $9^d$ are screwed and countersunk in the ends of said balls. Said balls fit inside of the cups 10 and are provided with grooves 15. Swivel-cogs 13, rotating in the walls of the cup 10 on any suitable ball-bearings, as shown in Fig. 4, fit into the grooves 15.

16 designates collars on the axle 9, which hold the balls 14 in position and allow the cups 10 full swing.

11 designates shoulders on the axle 9, against which the cups 10 fit.

Any of the various kinds of steering-gears which are adaptable may be attached to the yokes 6 $6^a$ at any suitable points.

The operation is as follows: Any suitable chain is used to attach the motor to the sprocket-wheel 3. Thus when the machine is in motion the front wheels as well as the hind will be driven by the motor. When it is desired to steer the front wheels in one direction or another, the swivel-cogs 13 turn in their bearings in the sides of the cups 10 and slip up or down in the grooves 15, and thus the wheels continue to be driven by the motor, no matter in which direction they are turned.

The axle 9 will of course act on ball or other desirable bearings; but as I do not claim that feature I have not shown them in the drawings.

For the sake of clearness and simplicity I have shown four swivel-cogs 13 and four grooves 15 in the ball 14. However, any number desired may be used.

I have entered into a detailed description of the construction and relative arrangement of parts embraced in the present and preferred embodiment of my invention. I do not desire, however, to be understood as confining myself to such specific construction, as such modifications may be made in practice as fairly fall within the scope of my claims.

Having thus described my invention, what I claim as new and useful, and desire to secure by Letters Patent, is—

1. In a device of the character described, the combination of an axle, a casing therefor, and means for driving said axle, yokes on the ends of said casing, female yokes pivotally receiving the same and each comprising two members clamped on the ends of said axle, a cup secured to said axle, a cog-ball secured to said axle and being provided with axial grooves, cogs swiveled in and carried by said cup and having their opposite ends seated in and adapted to slide in said grooves, as and for the purpose set forth.

2. In a device of the character described, the combination with an axle, and driving means therefor, of a casing surrounding the axle, male yoke members secured to the outer ends of said casing, female yoke members mounted on the axle and pivoted to the male yoke members, cups mounted on the yoke, and inclosed by the pivoted yoke members, means on the axle for holding the cups against longitudinal movement thereon, cog-balls mounted on the axle and inclosed by the cups, means on the axle for holding the cog-balls against longitudinal movement on the axle, and cogs swiveled in the cups, and engaging and working in grooves provided therefor in the cog-balls, substantially as described.

3. In a device of the character described, the combination with an axle, and driving means therefor, of a casing surrounding the axle, male yoke members secured to the outer ends of said casing, female yoke members mounted on the axle and pivoted to the male yoke members, cups mounted on the axle, means on the axle for holding the cups against longitudinal movement thereon, cog-balls mounted on the axle and inclosed by the cups, means on the axle at each side of the cog-balls to hold the latter against longitudinal movement on said axle, and cogs swiveled in the cups and taking into grooves provided therefor in the cog-balls, as and for the purpose described.

In testimony whereof I have signed my name to this specification in the presence of two subscribing witnesses.

CHARLES W. VAN WINKLE.

Witnesses:
JOSHUA B. WEBSTER,
ULYSSES S. G. MOWRY.